(12) United States Patent
Schweissthal (10) Patent No.: US 11,633,895 B2
(45) Date of Patent: Apr. 25, 2023

(54) SYSTEM OF INJECTION-MOULDING MACHINE CLOSING UNITS

(71) Applicant: KRAUSSMAFFEI TECHNOLOGIES GMBH, Munich (DE)

(72) Inventor: Patrick Schweissthal, Munich (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 487 days.

(21) Appl. No.: 16/615,187

(22) PCT Filed: May 16, 2018

(86) PCT No.: PCT/EP2018/062653
§ 371 (c)(1),
(2) Date: Nov. 20, 2019

(87) PCT Pub. No.: WO2018/224256
PCT Pub. Date: Dec. 13, 2018

(65) Prior Publication Data
US 2020/0171728 A1    Jun. 4, 2020

(30) Foreign Application Priority Data
Jun. 7, 2017 (DE) .......................... 102017112477.2

(51) Int. Cl.
*B29C 45/66* (2006.01)
*B29C 45/17* (2006.01)

(52) U.S. Cl.
CPC ........ *B29C 45/661* (2013.01); *B29C 45/1744* (2013.01)

(58) Field of Classification Search
CPC .. Y10T 292/216; B29C 45/661; B29C 45/681
See application file for complete search history.

(56) References Cited

U.S. PATENT DOCUMENTS

2018/0029272 A1* 2/2018 Tobita ................ B29C 45/7653
2021/0394412 A1* 12/2021 Kitta .................... B29C 45/1744

FOREIGN PATENT DOCUMENTS

CN       101637952 A    2/2010
CN       206048838 U    3/2017
(Continued)

OTHER PUBLICATIONS

International Search Report for PCT/EP2018/062653 dated Aug. 7, 2019.
(Continued)

*Primary Examiner* — S. Behrooz Ghorishi
(74) *Attorney, Agent, or Firm* — Pearne & Gordon LLP (57) ABSTRACT

A system of injection-moulding machine closing units is provided. In addition to two closing units of a first kind and third kind in a standard program, the closing units having closing forces F1 and F2, a further closing unit of a second kind having a closing force F1 is provided. The closing unit of the second kind forms an intermediate variable and is formed from components of the closing units of the first and third kind provided. The platens and the support plate with the dimensions of the closing unit of the third kind (closing force F2) and the toggle lever mechanism of the closing unit of the first kind (closing force F1) and the drive thereof are combined with one another. The articulated levers of the toggle lever mechanism of the closing unit of the second kind are hinged to the support plate and movable platen at a greater distance from the axis of symmetry than the articulated levers of the toggle lever mechanism of the closing unit of the first kind. The articulated levers themselves are identical. At the same time, the crosshead of the closing unit of the second kind is larger in the direction of the articulated levers of the toggle lever mechanism than the crosshead of the closing unit of the first kind such that the (Continued)

toggle lever mechanisms of the two closing units have the same kinematics.

17 Claims, 2 Drawing Sheets

(56) References Cited

FOREIGN PATENT DOCUMENTS

| DE | 202007012787 U1 | 1/2008 | | |
|---|---|---|---|---|
| DE | 202007017184 U1 | 6/2008 | | |
| DE | 102009035289 A1 | * 2/2010 | ......... | B29C 45/1744 |
| DE | 102009035289 A1 | 2/2010 | | |
| DE | 102009052051 A1 | 5/2010 | | |

OTHER PUBLICATIONS

Written Opinion for PCT/EP2018/062653 dated Aug. 7, 2019.
Press Release "World premiere: The new PX from Krauss<affei—the all-electric made to-measure machine" Retrieved from the Internet: https://www.kraussmaffeigroup.com/media/files/kmnews/en/PM_IMM_2016_10_PX_en.pdf, Oct. 19, 2016, pp. 1-5.
KraussMaffei, K 2016, Halle 15, Stand B27/C24/D24, "Die neue PX: Power trifft Flexibilitat", 2016, pp. 1-3, Retrieved from the Internet: https://plasticker.de/news/advertorial/km_k2016_02_de_x4d5s6g.php.
KraussMaffei, Engineering Passion, Power trifft Flexibilität Die neue vollelektrische PX-Baureihe, Sep. 2016, pp. 1-28.

* cited by examiner

SYSTEM OF INJECTION-MOULDING MACHINE CLOSING UNITS

CROSS-REFERENCE TO RELATED APPLICATIONS

This is a National Stage application of PCT international application PCT/EP2018/062653 filed on May 16, 2018, which claims the priority of German Patent Application No. 10 2017 112 477.2, filed Jun. 7, 2017, which are incorporated herein by reference in their entireties.

FIELD OF THE INVENTION

The invention relates to a system of injection-moulding machine closing units comprising two closing unit, wherein each of the two closing units is constructed as a toggle lever closing unit and wherein a modular construction is provided, in order to enable a greater freedom in the tool use.

BACKGROUND OF THE INVENTION

From DE202007012787U1 an injection-moulding machine with modular construction is known, wherein the machine bed is constructed in two parts and has standardized mounting- and coupling interfaces, which connect the mould closure side and the injection unit side to form a one-part injection-moulding machine. Thereby, the production and also the logistics, especially in the area of the machine manufacturer, are to be brought to a higher level of operating efficiency, without disadvantages arising therefrom for the customer.

BRIEF SUMMARY OF THE INVENTION

The invention is based on the problem of indicating a system of injection-moulding machine closing units by which it is possible to be able to offer a customer for a particular case of application according to a particular tool weight and a particular tool size not exclusively the closing unit which is actually provided for this, but also a smaller and thereby more favourably priced closing unit.

The solution to this problem takes place through a system of injection-moulding machine closing units with the features of Claim 1. Advantageous configurations and further developments are to be found in the dependent claims.

A central idea of the present invention assumes that injection-moulding machines with closing forces of different extents are usually offered by a machine manufacturer. The closing force here is a measurement which indicates how high the maximum clamping force of the closing unit is. The larger an injection-moulding tool is, the closing force of the closing unit and the platens must be all the greater, in particular the tool clamping surface available at the platens. Correlated with the size of an injection-moulding tool is therefore also the size of a closing unit, in particular with respect to the size of the platens and to the closing force which is able to be generated. When an injection-moulding tool is no longer suitable with regard to its dimensions and its weight for a closing unit with platens of a first size and with a first closing force F1, the acquisition of a closing unit with the next greater closing force F2 from the series of closing units offered by the machine manufacturer is necessary. Increased costs are entailed with this, in particular through the larger platens and the larger drives for moving the movable platen and for generating the greater closing force F2. However, cases of application can exist in which a customer would wish to use a large injection-moulding tool, however does not require the high closing forces F2 of the closing unit which is actually provided for this. It would be sufficient for the customer if only larger platens could be made available, which could be used in the closing unit with the first closing force F1.

In this context, the so-called inside pillar width also plays a part; one also speaks in terms of the inside width of the columns. This inside width determines the size of the tool clamping area and therefore constitutes an upper limit for the external dimensions of a tool. It has been found that the dimensions (inside pillar width) of the platens of toggle lever closing units, in particular of closing units with 5-point toggle lever, significantly influence the production costs of the closing unit. For this reason, the inside pillar width of a closing unit which is realized is to be regarded as a compromise of costs and adaptation to market-based tool dimensions.

In hydraulic closing units, often small inside pillar widths are offered in standard, which can optionally be increased by the use of enlarged platens without the closing unit becoming otherwise larger. Therefore, larger platens can be made available to the customer, which can be used in a closing unit with a first closing force F1 and the customer does not need to acquire a larger closing unit with a second closing force F2 greater than F1. In other words, this means the following: The standard embodiment of a closing unit with a closing force F1 can also be for the operation with enlarged platens, wherein only larger platens and, as a consequence thereof, a greater inside pillar width, come into use. Here, also, those platens can come into use which are present in any case in the programme of the machine manufacturer, namely those of the next greater closing force size. In this way, a modular construction results of the closing units to be found in the programme of the machine manufacturer, which makes possible for the customer a greater freedom in the tool use.

In contrast to hydraulic closing units, the inside pillar width in toggle lever closing units can not be readily enlarged by the use of enlarged platens. An optional enlargement of the inside pillar width in toggle lever closing units and, as a consequence thereof, an adaption of the geometric dimensions of the toggle lever to the changed sizes of the platens is problematic, because thereby the control parameters for moving the movable platen would change. The above applies to a particular extent for 5-point toggle lever closing units.

Consequently, according to the present invention, a system of injection-moulding machine closing units is indicated comprising two closing units, wherein each of the two closing units is constructed as a toggle lever closing unit, wherein each of the two closing units has a fixed platen, a movable platen, a support plate, a crosshead movable by means of a drive along the axis of symmetry of the closing unit, and at least one toggle lever mechanism, able to be actuated by means of the crosshead, arranged between support plate and movable platen and articulatedly connected with these plates, wherein each of the two closing units is constructed according to a first closing force F1, wherein one of the two closing units is equipped with platens of a first size and constitutes a closing unit of the first kind, wherein the other of the two closing units is equipped with platens of a second size and constitutes a closing unit of the second kind, wherein the platens of the closing unit of the second kind are larger than the platens of the closing unit of the first kind, in particular with respect to the tool clamping area, wherein the articulated levers of the toggle lever mechanism of the closing unit of the first kind and the articulated levers of the toggle lever mechanism of the closing unit of the second kind are constructed in an identical manner, at least with respect to the length between the respective articulation points P1, P2, P3, P4, P5 with articulated levers corresponding to one another with respect to their spatial arrangement in the respective closing unit, wherein the articulated levers of the toggle lever mechanism of the closing unit of the second kind are articulated at a greater distance with respect to the axis of symmetry at support plate and movable platen than the articulated levers of the toggle lever mechanism of the closing unit of the first kind, and wherein the crosshead of the closing unit of the second kind is constructed larger in the direction of the articulated levers of the toggle lever mechanism than the crosshead of the closing unit of the first kind, such that the toggle lever mechanisms of the two closing units have the same kinematics.

With the use of the larger platens, the articulation points at which the articulated levers are articulated at the support plate and at the movable platen, are shifted in their position with respect to the axis of symmetry of the closing unit preferably to the same extent outwards away from the axis of symmetry. Consequently, the crosshead is enlarged to an extent such that the kinematics of the toggle lever mechanism are maintained. The size of the crosshead is therefore adapted to the changed position of the articulated levers. The concern here is primarily the position of the articulation points at the crosshead, at which the toggle lever mechanism is connected articulatedly with the crosshead. The geometric dimensions of the toggle lever are retained, despite the enlarged platens. Therefore, in the closing unit of the first kind and in the closing unit of the second kind, the same articulated levers are used. The articulated levers should be constructed in an identical manner at least with regard to the length between the respective articulation points P1, P2, P3, P4, P5 with articulated levers corresponding to one another with respect to their spatial arrangement in the respective closing unit. The other dimensions are of rather secondary importance, therefore e.g. the thickness of the articulated levers. However, for the purpose of a modular construction, it is advantageous if the articulated levers of the closing unit of the second kind are altogether identical to the articulated levers of the closing unit of the first kind. One and the same articulated levers can therefore be installed both in the closing unit of the first kind and also in the closing unit of the second kind.

The customer therefore does not require a closing unit of the next larger closing force from the programme of the machine manufacturer, but rather only enlarged platens and an adapted crosshead. In the adaptation of the crosshead, the concern is merely that the kinematics of the toggle lever mechanism remain the same. The adaptation therefore lies in that the position of the articulation points at the crosshead are shifted to an extent away from the axis of symmetry that the kinematics of the toggle lever mechanism remain the same. Those platens can come into use which are available in any case in the programme of the machine manufacturer, namely those of the next greater closing force amount. In this way, a modular construction of the closing units to be found in the programme of the machine manufacturer results, which makes possible for the customer a greater freedom in the tool use.

Consequently, according to a further idea of the present invention, a system of injection-moulding machine closing units can also be provided, which comprises three closing units, wherein—in brief—in addition to two closing units, to be found in any case in the programme, with closing force amounts F1 and F2 spaced from one another in the conventional manner, a further closing unit is provided, which is suitable for injection-moulding tools for which normally a closing unit of the closing force amount F2 would be provided, which, however, is equipped with components of a closing unit of the smaller closing force amount F1. The further closing unit or respectively this "intermediate size" of closing unit is therefore formed from components which are present or provided for two closing units to be found in any case in the programme, with closing force sizes F1 and F2 which are spaced from one another in the conventional manner. In particular the platens and the support plate with the measurements of the larger closing force amount F2 and the toggle lever mechanism of the smaller closing fore amount F1 can be combined with one another. A modular construction is provided, so to speak, in order to enable a greater freedom in the tool use. As a result, the customer can be offered a more favourably priced closing unit than if this "intermediate size" of closing unit did not exist.

According to a first configuration of the invention, provision can be made that the articulated levers of the toggle lever mechanism of the closing unit of the first kind are articulated at a first distance to the axis of symmetry at support plate and movable platen, and that the articulated levers of the toggle lever mechanism of the closing unit of the second kind are articulated in a second distance to the axis of symmetry at support plate and movable platen, wherein a distance difference A results between the second and the first distance. The crosshead of the closing unit of the second kind can be constructed accordingly larger in the direction of the articulated levers of the toggle lever mechanism as a function of the distance difference A, than the crosshead of the closing unit of the first kind, preferably precisely by the amount of the distance difference A. The distances in question here concern the position of the articulation points, i.e. the distance difference A results from the position of the articulation points or respectively from the change of position of the articulation points in the closing unit of the second kind compared to the articulation points in the closing unit of the first kind.

Furthermore, provision can be made that the crosshead of the first closing unit and the crosshead of the second closing unit have respectively two fastening arrangements, in particular joint pins and/or joint plates, which are constructed for the articulated fastening of an articulated lever of the toggle lever mechanism, wherein the fastening arrangements lie symmetrically to the axis of symmetry. Preferably, respectively an upper and a lower fastening arrangement can be provided, i.e. a fastening arrangement lying above the axis of symmetry and a fastening arrangement lying below the axis of symmetry, which lie in a vertical plane. The distance between the articulation points of the fastening arrangements at the crosshead of the second closing unit should be greater by a particular length L than the distance between the articulation points of the fastening arrangements at the crosshead of the first closing unit.

When the above-mentioned distance difference A is present once above and once below the axis of symmetry, the length L will be provided as a function of the sum of the two distance differences, so that the toggle lever mechanisms of the two closing units have the same kinematics. The length L should preferably correspond to twice the distance difference. When therefore at least one upper and at least one lower toggle lever mechanism are provided and the distance difference A is present, then the distance H2 between the articulation points at the crosshead of the closing unit of the second kind should be twice the distance difference A greater than the distance H1 between the articulation points at the crosshead of the closing unit of the first kind, i.e. H2=H1+2A.

Preferably, the columns of the closing unit of the first kind and the columns of the closing unit of the second kind can have the same diameter. Thereby, in the closing unit of the second kind, a tool clamping area can be made available which is even slightly larger than the tool clamping area in the next larger closing unit, in which the diameter of the columns is greater than the diameter of the columns of the closing unit of the first kind.

According to a further idea of the present invention, the drive for moving the crosshead of the closing unit of the first kind can be identical with regard to its construction and its drive power to the drive for moving the crosshead of the closing unit of the second kind. In particular, identical motors can be provided. The use of the drives of the smaller closing unit of the first kind instead of the drives of the next larger closing unit has a positive effect on the cost side. Instead of motors, however, hydraulic drives can also be used.

According to a preferred further development of the system of injection-moulding machine closing units according to the invention, a further closing unit can be provided, which is constructed according to a second closing force F2 and constitutes a closing unit of the third kind, wherein the second closing force F2 is greater than the first closing force F1 of the closing units of the first and second kind. In particular, the concern here can be the closing unit provided in the programme of the machine manufacturer with the next greater closing force. The programme of the machine manufacturer would therefore comprise as standard a closing unit of the first kind with a first closing force F1 and as next larger closing unit a closing unit of the third kind with a second closing force F2. According to the invention, a closing unit of the second kind would now be able to be offered with the first closing force F1 in the programme of the machine manufacturer. This further closing unit of the second kind therefore forms the above-mentioned "intermediate size" of closing unit.

Depending on how intensively the idea of modular construction is to be developed, the platens of the closing unit of the second kind and the platens of the closing unit of the third kind can have the same height and/or the same width and/or the same thickness. Furthermore, the support plate of the closing unit of the second kind and the support plate of the closing unit of third kind can have the same height and/or the same width and/or the same thickness. The more identical components of the closing unit of the third kind can be used for the closing unit of the second kind, this has all the more favourable effect on the manufacturing costs and therefore on the investment costs to be rendered by the customer. In the most favourable case, platens and support plates with identical dimensions are used for the closing unit of the second kind and the closing unit of the third kind. For the closing unit of the second kind therefore the plates which are provided in any case in the programme of the machine manufacturer (platens, support plates) of the closing unit of the third kind can be used.

According to an embodiment of the invention, the platens of the closing unit of the second kind can have a tool clamping area which corresponds to the tool clamping area of the platens of the closing unit of the third kind plus an area portion of tool clamping area which is calculated from the difference between the diameter of the columns of the closing unit of the third kind and the diameter of the columns of the closing unit of the second kind. As a result, therefore, in the closing unit of the second kind, a tool clamping area can be made available which is larger than the tool clamping area in the closing unit of the third kind, according to how great the difference is between the diameter of the columns of the closing unit of the third kind and the diameter of the columns of the closing unit of the second kind. Here, the dimension between axes of the columns in the second closing unit can be equal in size to the dimension between axes of the columns in the third closing unit.

Advantageously, the platens of the closing unit of the second kind are designed for the same maximum tool weight as the platens of the closing unit of the third kind.

Furthermore, provision can be made that at each closing unit two pairs of articulated levers are provided, wherein the two pairs are arranged symmetrically to the axis of symmetry, and wherein the one pair is arranged above the axis of symmetry and the other pair is arranged below the axis of symmetry.

In addition, guide rails for the movable platen can be provided on the machine bed of the respective closing unit, wherein the dimension between axes of the guide rails is smaller in the closing unit of the first kind than the dimension between axes in the closing unit of the second kind.

When, moreover, a closing unit of the third kind is also provided, preferably the dimension between axes of the guide rails in the closing unit of the second kind can be precisely as great as the dimension between axes of the guide rails in a closing unit of the third kind. Particularly preferably in addition the base area of the machine bed in the closing unit of the second kind can be precisely as great as the base area of the machine bed in the closing unit of the third kind. For the closing unit of the second kind and the closing unit of the third kind therefore the same machine bed can be used.

Machine bed is understood to mean here a machine bed which is provided only for the structure of the closing unit. A distinct machine bed is provided for the injection unit of the injection-moulding machine. In so far as mention is made of a machine bed in the description of the present invention, the machine bed provided for the structure of the closing unit is meant thereby. In this respect, the term "machine bed" can also be understood here to mean "closing unit machine bed".

Preferably, the toggle lever mechanism can be constructed as a 4-point toggle lever or as a 5-point toggle lever. The embodiment as a 5-point toggle lever is particularly preferred because the total transmission which is able to be achieved enables a favourably priced dimensioning of the drives.

The description of the invention is to be made by means of the applicant's PX model range. In the applicant's PX model range, closing units having the following closing force amounts are offered as standard:

PX50 with 500 kN (approximately 50 tonnes) closing force
PX80 with 800 kN (approximately 80 tonnes) closing force
PX120 with 1200 kN (approximately 120 tonnes) closing force
PX160 with 1600 kN (approximately 160 tonnes) closing force
PX200 with 2000 kN (approximately 200 tonnes) closing force For the further description, the closing units of type PX50 and PX80 are to be used. According to the invention, a closing unit of type PX51 is now additionally provided, which is composed of components of the closing units PX50 and PX80. Some essential technical data regarding the respective closing force types PX50, PX51 and PX80 are indicated in Table 1. It can be seen therefrom that the platens and the support plate of the PX51 have identical dimensions to the PX80. The closing force of the PX51, however, corresponds to the closing force of the PX50. The articulated levers of PX50 and PX51 are likewise identical just as the motors for moving the crosshead. Only the crosshead is adapted in its size to the enlarged plates. The distance between upper to lower joint pin is greater in the PX51 than in the PX50. The precise difference of this distance results from the displacement of the articulation points at the support plate and at the movable platen in their position to the longitudinal axis of the machine from the PX50 to the PX51.

In the sense of the present description and also of the claims, the closing unit of the first kind corresponds to the PX50, the closing unit of the second kind corresponds to the PX51 and the closing unit of the third kind corresponds to the PX80. The closing unit of the first kind and the closing unit of the third kind are the closing units which have also been designated here as (standard) closing units present in any case in the programme. Accordingly, the PX50 and the PX80 can also be understood here as two (standard) closing units present in any case in the programme, with closing force amounts F1 and F2 which are separate from one another in the usual manner, wherein F1 is equal to 500 kN and F2 is equal to 800 kN. The PX51 therefore forms the further closing unit of the second kind, which can also be understood here as "intermediate size" of closing unit. The term "intermediate size" has already been introduced above in the description of the invention. This "intermediate size" is therefore formed from components which are present or provided for the two closing units PX50 and PX80, present in any case in the programme, with closing force amounts F1 (500 kN) and F2 (800 kN) separate from one another in the usual manner. With this concept, so to speak a modular construction is provided, in order to enable a greater freedom in the tool use. As a result, a more favourably priced closing unit can therefore be offered to the customer than if this "intermediate size" of closing unit did not exist.

BRIEF DESCRIPTION OF THE DRAWINGS

The invention is to be described further below by means of an example embodiment and with reference to FIGS. 1a to 2b. There are shown.

For comparable components, reference numbers with the addition "a" are used below for components of the PX50 and reference numbers with the addition "b" are used for components of the PX51.

DESCRIPTION OF EXAMPLE EMBODIMENTS

Figure 1A:
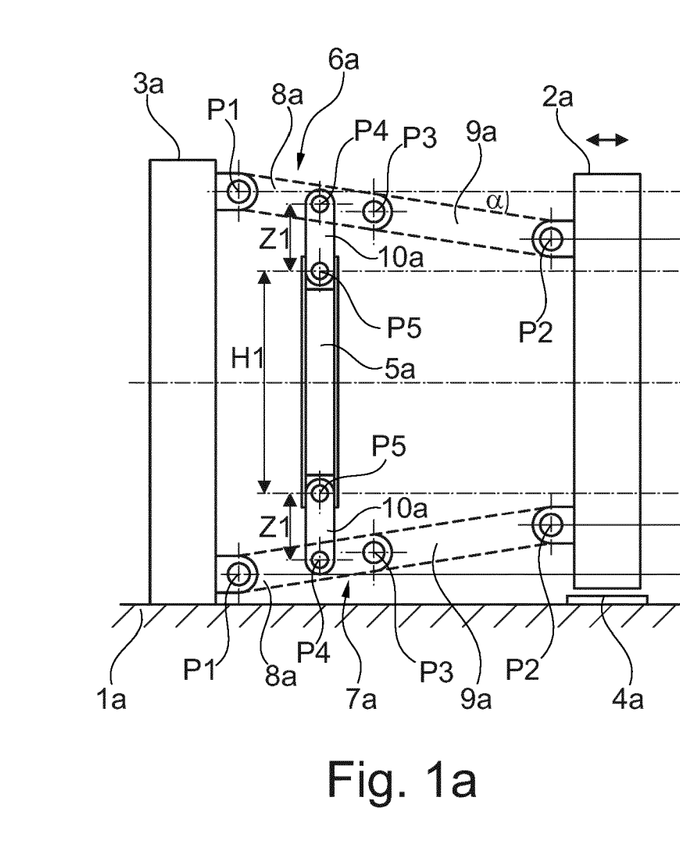
FIG. 1a partial side view of the closing unit PX50
FIG. 1b partial side view of the closing unit PX51
FIG. 2a top view in PX50 onto the crosshead from the direction of the movable platen
FIG. 2b top view in PX51 onto the crosshead from the direction of the movable platen Selected technical data for the PX50 and the PX51 are indicated in Table 1.
Figure 1B:
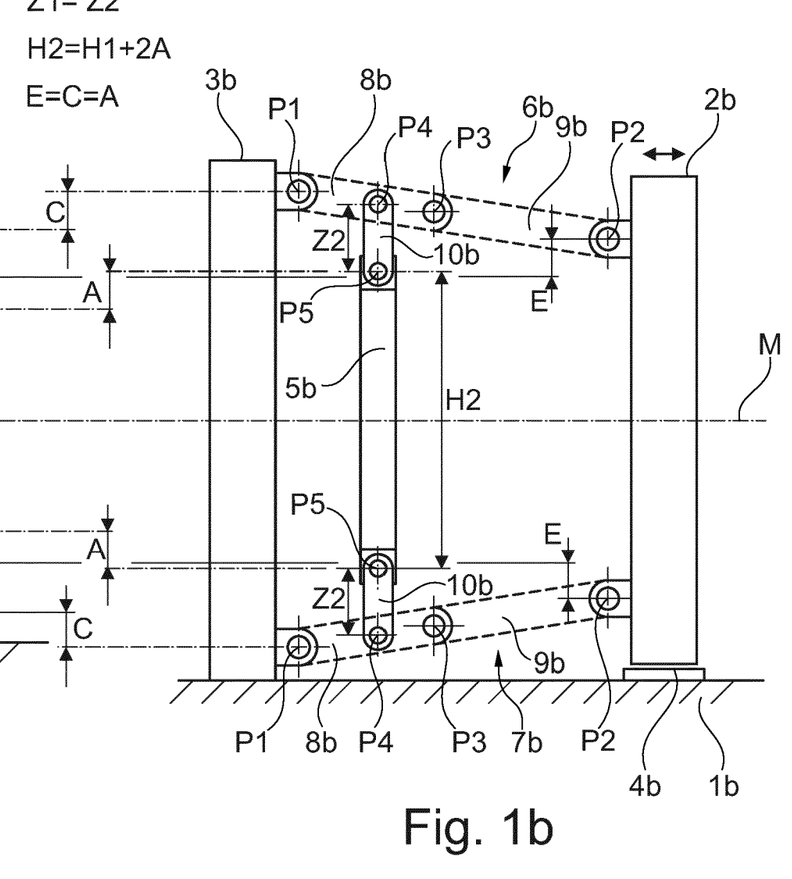

FIGS. 1a and 1b show respectively a machine bed 1a, 1b, on which the components of the closing unit are mounted. In addition to a fixed platen, which is not illustrated, respectively a movable platen 2a, 2b and a support plate 3a, 3b are provided. For better clarity, the columns are not illustrated in FIGS. 1a and 1b. The movable platens 2a and 2b are supported displaceably by means of indicated sliding shoes 4a, 4b or suchlike on or against guide rails 12a, 12b on the respective machine bed 1a, 1b. Each closing unit comprises a crosshead 5a, 5b, which can be moved respectively by means of a drive, not illustrated, known per se, along the longitudinal axis M of the machine. In PX50 (FIG. 1a) and in PX51 (FIG. 1b) respectively a toggle lever mechanism is arranged, wherein an upper toggle lever mechanism 6a, 6b and a lower toggle lever mechanism 7a, 7b are provided. The upper toggle lever mechanism 6a of the PX50 comprises a first articulated lever 8a articulated on the support plate and a second articulated lever 9a articulated on the movable platen 2a. At the first articulated lever 8a a further articulated lever 10a is articulated, which at its end facing away from the articulated lever 9a is articulatedly connected with the crosshead 5a. The lower toggle lever mechanism 7a of the PX50 is constructed in the same manner and comprises the same articulated levers 8a, 9a and 10a.

The toggle lever mechanisms 6b and 7b of the PX51 have, in the same manner, articulated levers 8b, 9b and 10b. The articulated levers 8a, 9a and 10a of the PX50 and the articulated levers 8a, 9b and 10b of the PX51 are constructed identically, i.e. of equal length, at least with respect to their length between the articulation points. With respect to the articulated levers 10a or respectively 10b articulated on the crosshead, this means Z1=Z2. The remaining measurements are of rather secondary importance, therefore e.g. the thickness of the articulated levers. In the sense of the modular construction, however, it is advantageous if the articulated levers 8a, 9a and 10a of the PX50 as a whole are identical to the articulated levers 8b, 9b and 10b of the PX51. One and the same articulated levers can therefore be installed both in the PX50 and also in the PX51. The crosshead 5b of the PX51 (corresponding to the closing unit of the second kind) is constructed to be larger in the direction of the articulated levers of the toggle lever mechanisms 6b and 7b than the crosshead 5a of the PX50 (corresponding to the closing unit of the first kind). The enlargement refers here to the distance H between upper and lower articulation point. As can be seen from FIGS. 1a and 1b, the distance H2 in the case of the crosshead 5b is greater than the distance H1 in the case of the crosshead 5a. The difference between H2 and H1 is provided by the displacement of the articulation mechanisms. Compared with FIG. 1a, the articulation points of the articulated levers 8b in FIG. 1b have been shifted by a length C, and the articulation points of the articulated levers 9b have been shifted by a length E away from the longitudinal axis M of the machine. Consequently, the articulation points for the articulated levers 10b at the crosshead have shifted by a length A. The measurement of the displacement is identical, i.e. E=C=A. Resulting from this also is the difference between H2 and H1, namely such that H2=H1+2A. The crosshead 5b of the PX51 is constructed to be larger in the direction of the articulated levers of the toggle lever mechanisms 6b and 7b therefore by twice the measurement of the displacement of the articulation mechanisms than the crosshead 5a of the PX50. Through the fact that the measurement of the displacement at the support plate 3b and at the movable platen 2b is of equal size (C=E), the angle α remains unchanged, which encloses the connection line of the two outer articulation points P1 and P2 with the longitudinal axis M of the machine. For the sake of simplicity, the angle α in FIG. 1 is illustrated with respect to a line lying parallel to the longitudinal axis M of the machine. As a whole, the result is therefore that the toggle lever mechanisms of the two closing units have the same kinematics.

Figure 2A:
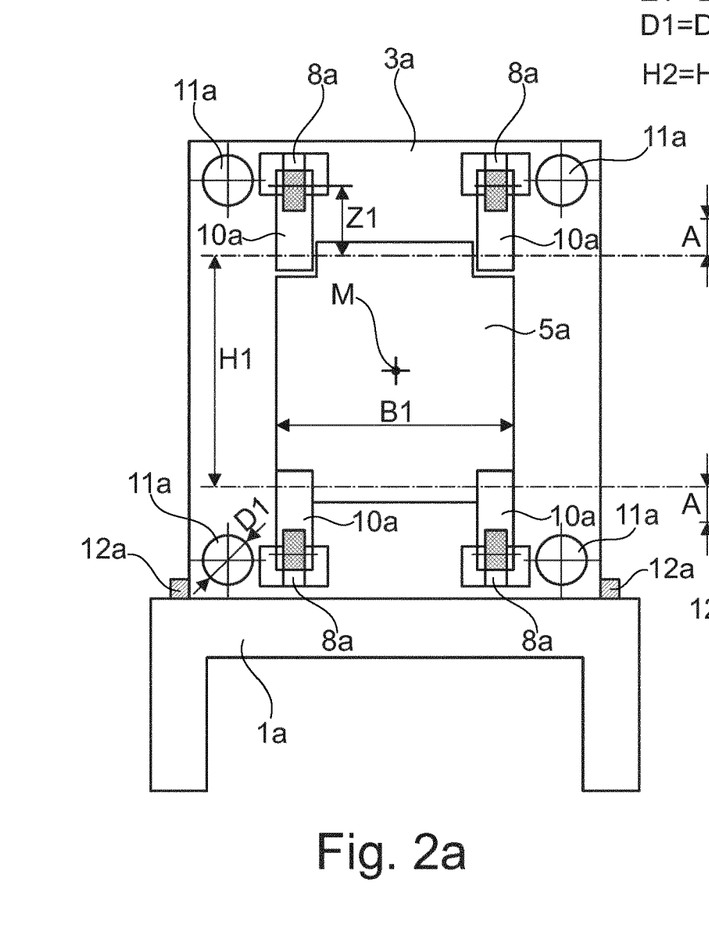
Figure 2B:
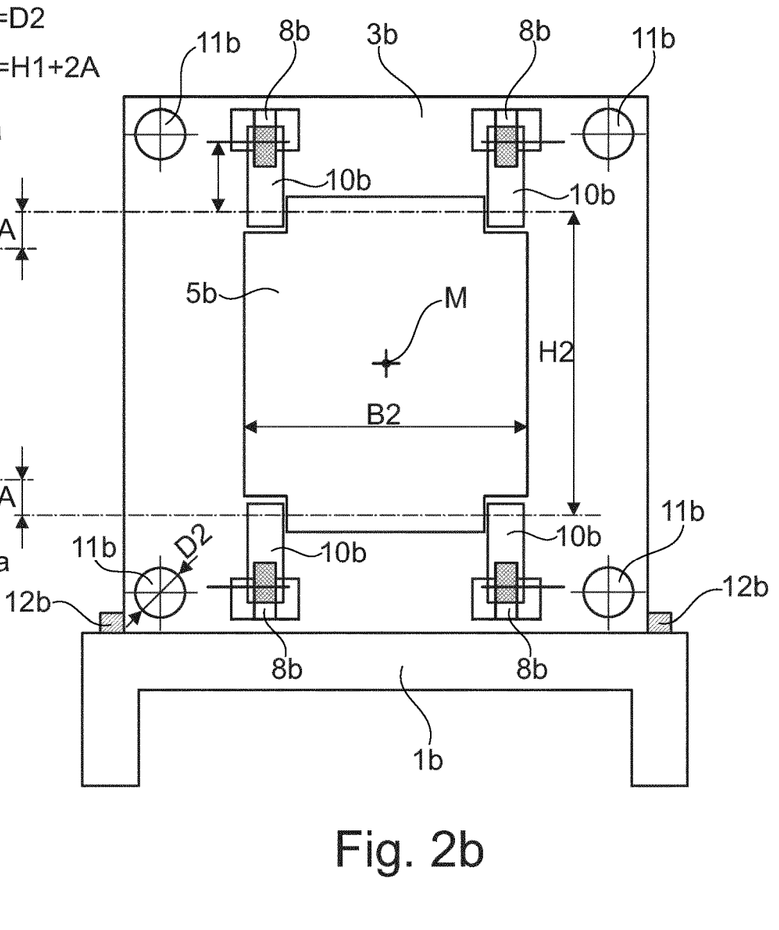

In FIGS. 2a and 2b, the columns 11a and 11b are drawn and their diameters are indicated by D1 in the case of the PX50 and by D2 in the case of the PX51. The diameter of the columns is identical in PX50 and PX51, i.e. D1=D2. The enlargement of the crosshead in the direction of the articulated levers can also be seen from the illustration in FIGS. 2a and 2b, i.e. H2=H1+2A. The width B1 or respectively B2 of the respective crosshead is not relevant, i.e. B1 can be of equal size to B2, or different, as illustrated in the present case.

For the sake of completeness, it is to be noted that all the measurements in the context of the toggle lever mechanism(s) always go to the rotation axis at the respective articulation points P1 to P5. The reference numbers P1 to P5 therefore designate in FIGS. 1a and 1b the position of the rotation axis in the respective articulations.

TABLE 1

Commonalities A = common between PX50 and PX51
(Commonalities B) = common between PX51 and PX80

|  | PX50 | PX51 | PX80 | Note |
|---|---|---|---|---|
| Closing force | 500 | 500 | 800 | [KN] |
| Tool weight | 450 | (750) | (750) | [Kg] |
| Columns axis distance | 425 × 375 | (490 × 440) | (490 × 440) | h × v [mm] |
| Columns inside width | 370 × 320 | 435 × 385 | 420 × 370 | h × v [mm] |
| Platens |  |  |  |  |
| FWAP | 620 × 560 | (700 × 645) | (700 × 645) | h × v [mm] |
| BWAP | 575 × 500 | (655 × 588) | (655 × 588) | h × v [mm] |
| Support plate | 800 × 590 | (870 × 685) | (870 × 685) | h × v [mm] |
| Thickness FWAP, BWAP and support plate | 155 | (175) | (175) | [mm] |
| Toggle lever mechanism |  |  |  |  |
| Crosshead | 251.2 | 321.2 | 288 | Upper to lower joint pin distance at crosshead [mm] |
| Drive | Motor 1 | Motor 1 | Motor 2 | Drive motor crosshead |
| Articulation 1 | 295 | 295 | 340 | Articulation eyes distance [mm] |
| Articulation 2 | 197 | 197 | 227 | Articulation eyes distance [mm] |
| Articulation 3 | 118 | 118 | 136 | Articulation eyes distance [mm] |
| Machine bed (closing unit) | 2000 × 650 | (2300 × 700) | (2300 × 700) | Machine bed base area [mm] |
| Guide rails axis distance BWAP | 474 | 554 | 554 | [mm] |
| Columns | 55 | 55 | 70 | Column diameter [mm] |

LIST OF REFERENCE NUMBERS 1a, 1b machine bed
2a, 2b movable platen
3a, 3b support plate
4a, 4b sliding shoes
5a, 5b crosshead
6a, 6b upper toggle lever mechanism
7a, 7b lower toggle lever mechanism
8a, 8b articulated lever to the support plate
9a, 9b articulated lever to the movable platen
10a, 10b articulated lever to the crosshead
11a, 11b columns
12a, 12b guide rails

The invention claimed is:

1. A system of injection-machine closing units comprising first and second closing units, wherein each of the first and second closing units is constructed as a toggle lever closing unit, wherein each of the first and second closing units comprises:

a fixed platen;

a movable platen;

a support plate;

a crosshead movable by means of a drive along an axis of symmetry of the first or second closing unit; and at least one toggle lever mechanism able to be actuated by means of the corresponding crosshead, arranged between the corresponding support plate and the corresponding movable platen and articulatedly connected with the corresponding support plate and the corresponding movable platen, said at least one toggle lever mechanism comprising:

a first lever having first and second ends, the first end of the first lever being articulatedly connected to the corresponding support plate at a first articulation point;

a second lever having first and second ends, the first end of the second lever being articulatedly connected to the corresponding movable platen at a second articulation point, and the second end of the second lever being articulatedly connected to the second end of the first lever at a third articulation point; and a third lever having first and second ends, the first end of the third lever being articulatedly connected to the first lever at a fourth articulation point, said fourth articulation point being located between the first and second ends of the first lever, and the second end of the third lever being articulatedly connected to the corresponding crosshead at a fifth articulation point, wherein each of the first and second closing units is constructed according to a first closing force F1, wherein one of the first and second closing units is configured such that its movable platen is of a first size and constitutes a closing unit of a first kind, wherein the other of the first and second closing units is configured such that its movable platen is of a second size and constitutes a closing unit of a second kind, wherein the movable platen of the closing unit of the second kind is larger than the movable platen of the closing unit of the first kind with respect to a tool clamping area, wherein the first, second, and third levers of the toggle lever mechanism of the closing unit of the first kind are identical to the first, second, and third levers of the toggle lever mechanism of the closing unit of the second kind such that respective distances between:

the first articulation point and the third articulation point of the toggle lever mechanism of the closing unit of the first kind and the first articulation point and the third articulation point of the toggle lever mechanism of the closing unit of the second kind are the same, the second articulation point and the third articulation point of the toggle lever mechanism of the closing unit of the first kind and the second articulation point and the third articulation point of the toggle lever mechanism of the closing unit of the second kind are the same, and the fourth articulation point and the fifth articulation point of the toggle lever mechanism of the closing unit of the first kind and the fourth articulation point and the fifth articulation point of the toggle lever mechanism of the closing unit of the second kind are the same, and said respective first, second, and third levers of the toggle lever mechanism of the closing unit of the first and second kinds corresponding to one another with respect to their spatial arrangement in the respective closing unit, wherein the first, second, and third levers of the toggle lever mechanism of the closing unit of the second kind are articulated at a greater distance to the axis of symmetry at the corresponding support plate and the corresponding movable platen than the first, second, and third levers of the toggle lever mechanism of the closing unit of the first kind, and wherein the crosshead of the closing unit of the second kind has a greater length in a direction perpendicular to the axis of symmetry than a corresponding length of the crosshead of the closing unit of the first kind, such that the toggle lever mechanisms of the first and second closing units have the same kinematics.

2. The system according to claim 1, wherein the first, second, and third levers of the toggle lever mechanism of the closing unit of the first kind are articulated in a first distance to the axis of symmetry at the corresponding support plate and at the corresponding movable platen, the first, second, and third levers of the toggle lever mechanism of the closing unit of the second kind are articulated in a second distance to the axis of symmetry at the corresponding support plate and at the corresponding movable platen, wherein a distance difference results between the second distance and the first distance, and wherein the crosshead of the closing unit of the second kind is constructed larger in the direction perpendicular to the axis of symmetry as a function of the distance difference than the crosshead of the closing unit of the first kind, by the amount of the distance difference.

3. The system according to claim 1, wherein the crosshead of the first closing unit and the crosshead of the second closing unit respectively have two fastening arrangements, which are constructed for an articulate fastening of the corresponding third lever, wherein the fastening arrangements lie symmetrically to the axis of symmetry, and wherein a distance between the articulation points of the fastening arrangements at the crosshead of the second closing unit is greater by a length L than a distance between the articulation points of the fastening arrangements at the crosshead of the first closing unit.

4. The system according to claim 3, wherein an upper and a lower fastening arrangement are provided respectively at the crosshead of the closing unit of the first kind and at the crosshead of the closing unit of the second kind.

5. The system according to claim 3, wherein the two fastening arrangements are joint pins and/or joint plates.

6. The system according to claim 1, wherein columns of the closing unit of the first kind and columns of the closing unit of the second kind have the same diameter.

7. The system according to claim 1, wherein the drive for moving the crosshead of the first closing unit is identical with regard to its construction and its drive power to the drive for moving the crosshead of the second closing unit.

8. The system according to claim 7, wherein the drive for moving the crosshead of the first closing unit and the drive for moving the crosshead of the second closing unit are identical electric motors or identical hydraulic motors.

9. The system according to claim 1, further comprising a third closing unit, wherein the third closing unit is constructed according to a second closing force F2 and constitutes a closing unit of a third kind, wherein the second closing force F2 is greater than the first closing force F1 of the closing units of the first and second kind.

10. The system according to claim 9, wherein the movable platen of the closing unit of the second kind and a movable platen of the closing unit of the third kind have the same height and/or the same width and/or the same thickness.

11. The system according to claim 10, wherein on machine beds of the respective first, second, and third closing units, guide rails are provided for the corresponding movable platens, wherein an axis distance of the guide rails in the closing unit of the first kind is smaller than an axis distance of the guide rails in the closing unit of the second kind, wherein the axis distance of the guide rails in the closing unit of the second kind is precisely as great as an axis distance of the guide rails in the closing unit of the third kind and wherein a base area of the machine bed in the closing unit of the second kind is precisely as great as a base area of the machine bed in the closing unit of the third kind.

12. The system according to claim 9, wherein the support plate of the closing unit of the second kind and a support plate of the closing unit of the third kind have the same height and/or the same width and/or the same thickness.

13. The system according to claim 9, wherein the movable platen of the closing unit of the second kind has a tool clamping area which corresponds to a tool clamping area of a movable platen of the closing unit of the third kind plus an area portion of tool clamping area which is calculated from a difference between a diameter of columns of the closing unit of the third kind and a diameter of columns of the closing unit of the second kind.

14. The system according to claim 13, wherein an axis distance of the columns in the closing unit of the second kind is of equal size to an axis distance of the columns in the closing unit of the third kind.

15. The system according to claim 9, wherein the movable platen of the closing unit of the second kind is designed for the same maximum tool weight as a movable platen of the closing unit of the third kind.

16. The system according to claim 1, wherein at each of the first and second closing units, two pairs of said first, second, and third levers are provided, wherein the two pairs are arranged symmetrically to the axis of symmetry, and wherein one of the two pairs is arranged above the axis of symmetry and the other of the two pairs is arranged below the axis of symmetry.

17. The system according to claim 1, wherein the toggle lever mechanism is constructed as a 4-point toggle lever or as a 5-point toggle lever.

* * * * *